(12) United States Patent
Braun et al.

(10) Patent No.: US 9,705,573 B2
(45) Date of Patent: Jul. 11, 2017

(54) CONTROLLING MULTIPLE-INPUT AND MULTIPLE-OUTPUT OPERATION OF A COMMUNICATION DEVICE WHEN THE DEVICE IS ATTACHED TO A BATTERY CHARGER

(71) Applicant: MOTOROLA MOBILITY LLC, Chicago, IL (US)

(72) Inventors: Mark Braun, Arlington Heights, IL (US); Santhosh Kumar Gillella, Mundelein, IL (US); Ranjeet Gupta, Chicago, IL (US); Mary Hor-Lao, Chicago, IL (US); Sudhir C. Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/734,603

(22) Filed: Jun. 9, 2015

(65) Prior Publication Data

US 2016/0295569 A1    Oct. 6, 2016

Related U.S. Application Data

(60) Provisional application No. 62/141,195, filed on Mar. 31, 2015.

(51) Int. Cl.
*H04W 24/00* (2009.01)
*H04B 7/0413* (2017.01)
*H04W 52/02* (2009.01)

(52) U.S. Cl.
CPC ......... *H04B 7/0413* (2013.01); *H04W 52/02* (2013.01)

(58) Field of Classification Search
CPC .............................. H04W 24/00; H04W 52/02
See application file for complete search history.

(56) References Cited

U.S. PATENT DOCUMENTS

| | | | | |
|---|---|---|---|---|
| 5,115,182 A * | 5/1992 | Ehmke | ................. | H02J 7/0078 320/136 |
| 8,401,981 B1 * | 3/2013 | Sandler | ................. | G06F 1/1626 706/12 |
| 8,457,029 B2 * | 6/2013 | Vaidya | ................. | G06F 1/3203 370/311 |
| 8,830,892 B2 * | 9/2014 | Chung | ................. | H04W 52/02 370/311 |

(Continued)

OTHER PUBLICATIONS

Hang Yu, Lin Zhong, Ashutosh Sabharawal: Power Management of MIMO Network Interfaces on Mobile Systems, Very Large Scale Integration (VLSI) Systems, IEEE Transactions on (vol. 20, Issue:7, Jun. 23, 2011, pp. 1175-1186.

(Continued)

*Primary Examiner* — Shantell L Heiber
(74) *Attorney, Agent, or Firm* — Yudell Isidore PLLC

(57) ABSTRACT

A method for controlling multiple-input and multiple-output operation in a communication device when the communication device is attached to a battery charger includes determining that a battery level of a communication device is below a first battery level threshold. The method further includes determining that the communication device is attached to a battery char and determining whether to disable multiple-input and multiple-output operation of the communication device while it is attached to the battery charger.

20 Claims, 8 Drawing Sheets

(56) References Cited

U.S. PATENT DOCUMENTS

| | | | |
|---|---|---|---|
| 9,300,158 B2* | 3/2016 | Kerfoot, Jr. | H02J 7/00 |
| 2005/0041616 A1* | 2/2005 | Ginzburg | H04L 1/0021 |
| | | | 370/328 |
| 2009/0323652 A1* | 12/2009 | Chen | H04B 1/406 |
| | | | 370/338 |
| 2013/0266085 A1* | 10/2013 | Sesia | H04B 7/0413 |
| | | | 375/295 |
| 2014/0184143 A1* | 7/2014 | Coakley | H02J 4/00 |
| | | | 320/107 |
| 2014/0187239 A1* | 7/2014 | Friend | H04L 69/08 |
| | | | 455/426.1 |

OTHER PUBLICATIONS

Hongseok Kim; Chan-Byoung Chae; de Veciana, G.; Heath, R.W.: "A cross-layer approach to energy efficiency for adaptive MIMO systems exploiting spare capacity", Wireless Communications, IEEE Transactions on Year: Aug. 2009, vol. 8, Issue: 8, pp. 4264-4275.

Hongseok Kim; Chan-Byoung Chae; de Veciana, G.; Heath, R.W.: "Energy-efficient adaptive MIMO systems leveraging dynamic spare capacity", Information Sciences and Systems, 2008, CISS 2008, 42nd Annual Conference, 2008, IEE Conference Publications, pp. 66-73.

Siam, Mohammad Z. et al.: "Energy-efficient protocols for wireless networks with adaptive MIMO capabilities", Wireless Networks vol. 16, Issue 1, (2010), pp. 199-212, DOI 10.1007/s11276-008-0124-3.

* cited by examiner

CONTROLLING MULTIPLE-INPUT AND MULTIPLE-OUTPUT OPERATION OF A COMMUNICATION DEVICE WHEN THE DEVICE IS ATTACHED TO A BATTERY CHARGER

FIELD OF THE DISCLOSURE

The present disclosure relates to controlling multiple-input and multiple-output operation in a communication device, and more particularly to controlling multiple-input and multiple-output operation in a communication device that is attached to a battery charger.

BACKGROUND

Multiple-input and multiple-output (MIMO) is a method for multiplying the capacity of a radio link using multiple transceiver paths and corresponding antennas to exploit multipath propagation for communicating data between two wireless devices. This can be desirable in some scenarios, for example when downloading a movie. However, using MIMO operation of a communication device consumes battery life at a faster rate than non-MIMO operation. Therefore, balancing battery life constraints with communicating data using MIMO technology is always a consideration in wireless communication device design.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
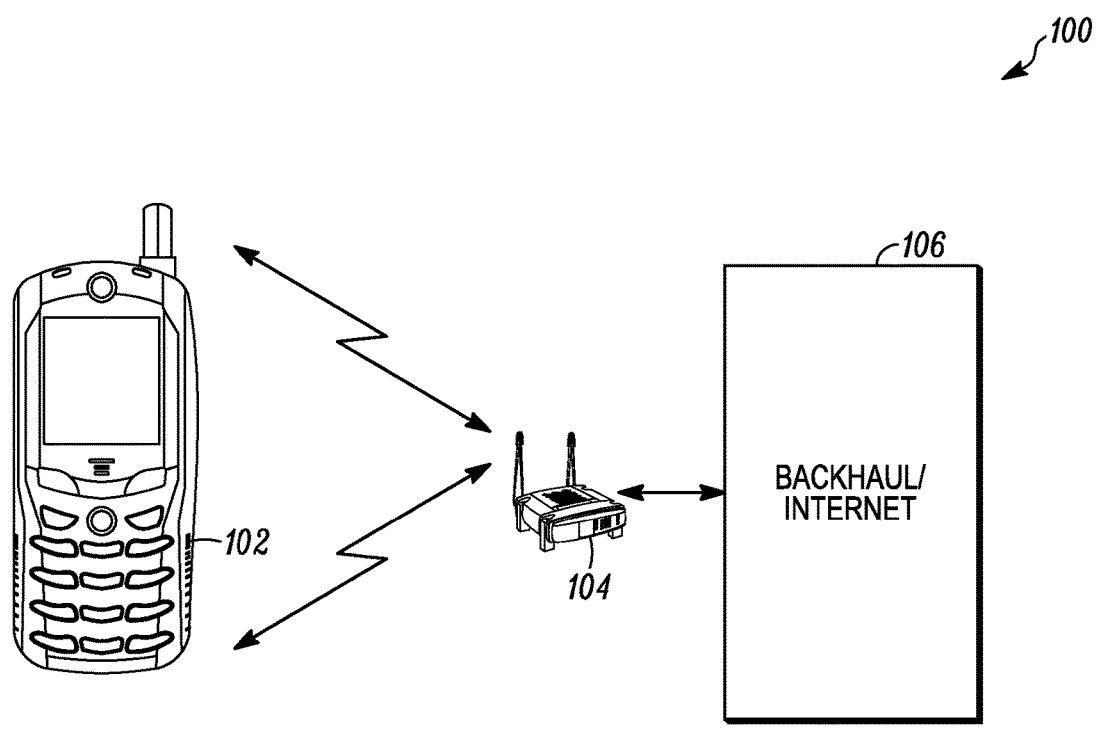
FIG. 1 is a schematic diagram of an example environment within which is implemented methods and apparatus for controlling MIMO operation in a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, a method and communication device is described for controlling multiple-input and multiple-output operation of a communication device when the communication device is attached to a battery charger. For example, MIMO operation is disabled upon the communication device determining that it is attached to a turbo battery charger. This reduces internal battery drain to enable the device to meet turbo charging specifications, for example charging the battery to a certain percentage within a certain amount of time, which might not be possible with MIMO enabled.

For another example, MIMO operation is disabled when the communication device is attached to a non-turbo or regular battery charger and the communication device detects that a charging rate of the internal battery is less than a discharge rate of the internal battery.

FIG. 1 illustrates a schematic diagram of an example environment 100 within which may be implemented methods and apparatus for controlling MIMO operation in a communication device. Environment 100 includes a communication device 102, an access point 104, and infrastructure equipment 106. In this example environment, the communication device 100 is a mobile or portable device configured to wirelessly communicate with the access point 104. Example communication devices include a smartphone, a cellular phone, a phablet, a tablet, a personal digital assistant, a mobile phone, a media player, or another type of portable electronic device capable of capable of communicating with the devices in accordance with various aspects of the disclosed embodiments.

The access point 104 is, for example, a wireless fidelity (Wi-Fi) router that communicates with the infrastructure equipment 106, which can be for example "backhaul" for a cellular site or network that provides access to the Internet. For this example, the access point 104 and the communication device 102 are configured to operate in accordance with various Wi-Fi standards (e.g., 802.11a, b, g, n, ac), and particularly operate in accordance with Wi-Fi standards that support MIMO technology. In other embodiments, the access point 104 and communication device 102 are configured to support other short range wireless technologies, such as HomeRF (Home Radio Frequency), Home NodeB (3G femtocell), Bluetooth, Worldwide Interoperability for Microwave Access (WiMax), or any other type of short range wireless technology capable of performing MIMO communications.

In some embodiments, the access point 104 is a communication device that operates as a Mobile Hotspot or a Wi-Fi group owner. A Mobile Hotspot creates a Wi-Fi area coverage allowing nearby Wi-Fi devices to connect to the Internet via a cellular network. The backhaul 106, in such an example, is a cell site, NodeB, microcell, and the like, configured to support cellular communications of data over the wireless connections using any suitable wireless technologies, such as, High-Speed Packet Access (HSPA+), WiMax, Long Term Evolution (LTE), and the like. A Wi-Fi group owner functions as a Wi-Fi access point allowing other devices to connect as Wi-Fi clients. If the access point 104 operates as a Wi-Fi group owner, the backhaul 106 could be any type of Wi-Fi network (e.g., using IEEE 802.11a, b, g, n, ac, Wi-Fi Direct, or Wi-Fi Peer-to-Peer standards) or a cellular network that allows the group owner to connect to a data network, such as the Internet. In other example scenarios, the backhaul/Internet 106 represents any intervening networks or computing components necessary to provide the access point 104 a connection with the Internet.

Both the communication device 102 and the access point 104 are configured to operate using 802.11ac high throughput (HT) bandwidths, such as HT20, HT40, HT80, and HT160. These HT bandwidths provide devices with wider channels that allows for the use of MIMO communications between the communication device 102 and the access point 104. In a MIMO system, spatial multiplexing is used to increase throughput for data transmissions by, for example, dividing a high rate data stream into multiple low rate data streams and sending each low rate data stream over the same channel using different antennas. In other words, different data streams are transmitted over the same channel using different antennas. In addition, in a MIMO system, spatial diversity is used to make data transmissions more robust or reliable. Using spatial diversity, robustness is increased by creating multiple data streams of the same data and transmitting the same data redundantly over the same channel using multiple antennas.

Regardless of whether multiple paths are used to increase throughput or reliability, using MIMO to transmit data via multiple paths requires operating more than one antenna. When one antenna is used to communicate data, the electronic components of the communication device 102 forming the transceiver path associated with that antenna requires power. If more than one antenna is used, then more than one transceiver path is powered in whole or in part. The increased number of operating transceiver paths creates a greater drain on battery resources of the communication device 102. Although MIMO is capable of providing greater throughput and greater reliability, this benefit can come at the cost of greater battery consumption.

Figure 2:
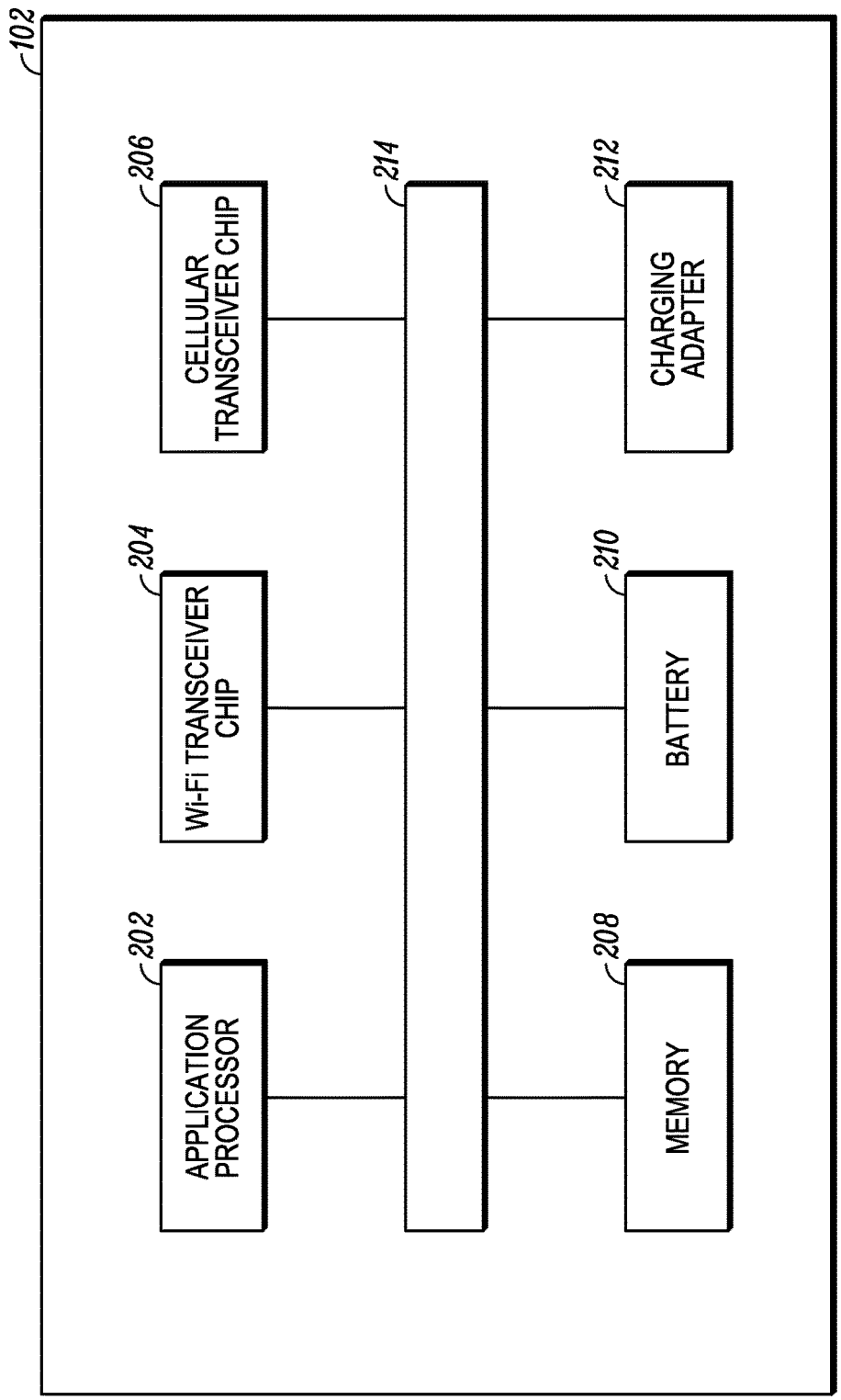
FIG. 2 is a block diagram illustrating example internal components of a communication device configured for controlling MIMO operation in accordance with some embodiments.

Referring now to FIG. 2, therein is provided a block diagram illustrating example internal hardware components of a wireless communication device, such as the communication device 102, in accordance with the present teachings. As shown in FIG. 2, the internal elements or components include an application processor 202, a Wi-Fi transceiver chip 204, a cellular transceiver chip 206, a memory component 208, a battery 210, and a charging adapter 212. As further illustrated, the internal components 200 are coupled to one another, and in communication with one another, by way of one or more internal communication links 214, for instance an internal bus. A limited number of device components 202, 204, 206, 208, 210, 212, and 214 are shown for ease of illustration, but other embodiments may include a lesser or greater number of such components. Moreover, other elements needed for a commercial embodiment of a device that incorporates the components shown are omitted from FIG. 2 for clarity in describing the enclosed embodiments.

The application processor 202 provides main or core processing capabilities within the communication device 102 and, in an embodiment, serves as a primary processor which processes computer-executable instructions to control operation of the device 102. For example, the application processor 202 is implemented as a system-on-chip (SoC) that supports word processing applications, email and text messaging applications, signaling protocols, video and other image-related and/or multimedia applications, etc., executable on the communication device 102.

The Wi-Fi transceiver chip 204 is configured to conduct Wi-Fi communications in accordance with the IEEE 802.11 (e.g., a, b, g, n, or ac) standards using HT and MIMO communication techniques. In other embodiments, the Wi-Fi transceiver chip 204 instead (or in addition) conducts other types of communications commonly understood as being encompassed within Wi-Fi communications such as some types of peer-to-peer (e.g., Wi-Fi Peer-to-Peer) communications and Mobile Hotspot operations. Further, in other embodiments, the Wi-Fi transceiver chip 204 is replaced or supplemented with one or more other wireless transceivers configured for non-cellular wireless communications including, for example, wireless transceivers employing ad hoc communication technologies such as HomeRF, Home Node B (3G femtocell), Bluetooth and/or other wireless communication technologies such as infrared technology.

The wireless transceiver chip 206 is configured to conduct cellular communications of data over wireless connections using any suitable wireless technology, such as Third Generation (3G), Fourth Generation (4G), LTE, etc., vis-à-vis cell towers or base stations. In other embodiments, the wireless transceiver chip 206 is configured to utilize any of a variety of other cellular-based communication technologies such as analog communications (using Advanced Mobile Phone System—AMPS), digital communications (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.), and/or next generation communications (using Universal Mobile Telecommunication System (UMTS), Wideband CDMA (WCDMA), LTE, Institute of Electrical and Electronics Engineers (IEEE) 802.16, etc.), or variants thereof.

The memory component 208 in various embodiments can include one or more of: volatile memory elements, such as random access memory (RAM); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the memory component 208 includes a region of shared memory accessible to various components of the communication device 102, such as the application processor 202 and the cellular transceiver chip 206.

The internal components of the communication device 102 also include a battery 210 for providing power to the other internal components while enabling the communication device 102 to be portable. Various components of the communication device 102, such as the application processor 202 and the Wi-Fi transceiver chip 204 alone or in combination with other components, are configured to determine a level of charge remaining in the battery 210.

The charging or charge adapter 212 regulates current from an external battery charger connected to a power source or power supply, to which the communication device is attached in order to charge the battery 210. The battery charger can be a "turbo charger" or a regular (non-turbo charger). A turbo charger is configured to allow higher currents and power than regular chargers to more quickly charge the battery 210, for example up to 75% percent faster using 60 Watts of power rather than the conventional 9 Watts. For a further embodiment, the charge adapter 212 is configured to ask for various levels of direct current (DC) voltage coming from the power supply to regulate current, to a maximum amount of current draw, given the charge level of the battery 210 to, thereby, preserve the longevity of the battery 210.

Figure 3:
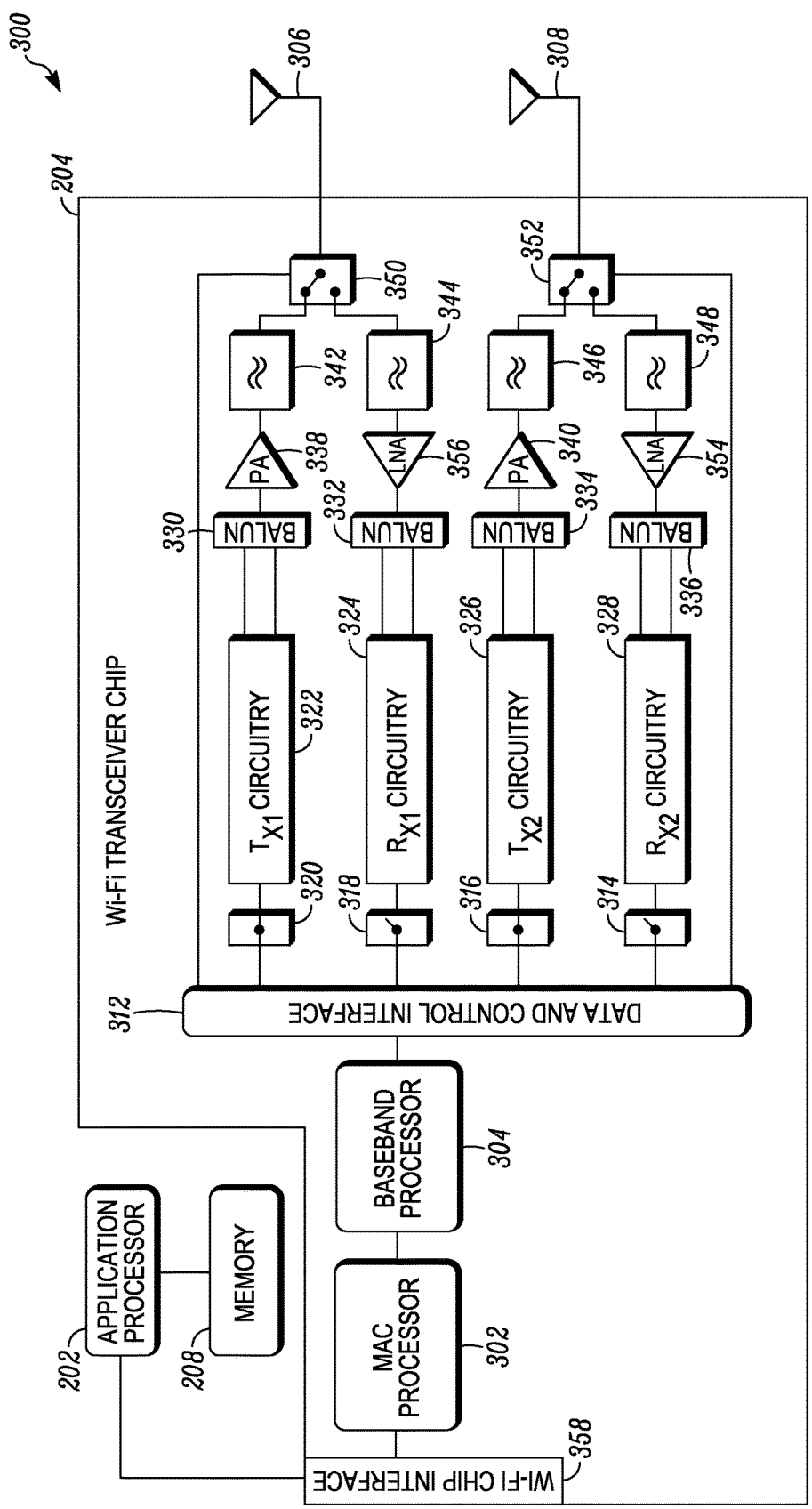
FIG. 3 is a schematic diagram of a communication device architecture configured for controlling MIMO operation in accordance with some embodiments.

FIG. 3 is a schematic diagram of various internal hardware components 300 of the communication device 102 configured to execute a variety of functions associated with MIMO operation of the communication device 102. The components 300 include the application processor 202, the memory 208 and a transceiver component. For this example, the transceiver component is the Wi-Fi transceiver (XCVR) chip 204. However, in another embodiment, the transceiver component could be the cellular transceiver chip 206. As illustrated, the Wi-Fi transceiver chip 204 includes a media access control (MAC) processor 302, a baseband processor 304, a data and control interface 312, and multiple transceiver paths that enable the MIMO operation.

As shown, each transceiver path includes a transmit path and a corresponding receive path both connected to a same antenna. For example, a first transceiver path includes a transmit (Tx) path having a switch 320, Tx1 circuitry 322, a balun 330, a power amplifier (PA) 338, and a filter 342 coupled through a duplexer 350 to an antenna 306. A corresponding receive (Rx) path of the first transceiver path includes a switch 318, Rx1 circuitry 324, a balun 332, a low noise amplifier (LNA) 356, and a filter 344 coupled through the duplexer 350 to the antenna 306. Similarly a second transceiver path includes a transmit path having a switch 316, Tx2 circuitry 326, a balun 334, a power amplifier 340, and a filter 346 coupled through a duplexer 352 to an antenna 308. A corresponding receive path of the first transceiver path includes a switch 314, Rx1 circuitry 328, a balun 336, a low noise amplifier 354, and a filter 348 coupled through the duplexer 352 to the antenna 308.

The application processor 202 is coupled to the Wi-Fi transceiver chip 204 by way of a bus (e.g., a peripheral component interconnect express or secure digital input/output bus), which communicates signals and data to various components of the chip 204 through a Wi-Fi chip interface 358. Such signals and data can include various statistics and measurements, determined by the application processor, related to the quality of the connections that the communication device 102 has established with an external device. Such statistics are also referred to herein as parameters that indicate quality of service associated with communicating data to another (external) device.

The Media Access Control MAC processor 302 performs signaling functions associated with establishing and maintaining a MAC layer connection with devices external to the communication device 102, such as the access point 104. The MAC processor 302 is also configured to track various statistics and measurements related to MAC layer operations including statistics related to the quality of the connections that the communication device 102 has established with an external device. These statistics are also referred to herein as parameters that indicate quality of service associated with communicating data to another (external) device.

The baseband processor 304 manages radio control functions, such as signal generation, modulation, encoding, as well as frequency shifting. Illustratively, when the communication device 102 is transmitting data, the baseband processor 304 propagates a baseband signal through a transmit path. The baseband signal is a signal used to modulate a carrier wave and is defined by an in-phase (I) component and a quadrature (Q) component. The I component is a zero phase cosine component, and the Q component is a phase Π/2 sine component.

In an example illustration of communicating a signal through a transmit path, the baseband signal is communicated to transmit circuitry $T_{X1}$ 322. The transmit circuitry 322 (and 326) include elements not pictured such as: digital to analog converters to convert the baseband signals from digital to analog form; baseband filters to remove harmonic distortions and alias components in the baseband signals; and IQ modulators, also referred to in the art as frequency mixers and multipliers, to mix the baseband signals with in-phase and quadrature carrier signals of a carrier signal having a carrier frequency constructed using a local oscillator to up-convert the baseband signal to a higher frequency modulated radio frequency signal in differential form.

The I and Q components of the RF signal are communicated to the balun 330, which converts the I and Q signal components from differential to single ended form. Power amplifier 338 provides an additional power gain stage to the signal, and the filter 342 filters frequencies outside the transmit band. In response to signals from a data and control interface 312, the duplexer 350 is configured to connect one of the filters 342 to an antenna 306. The antenna 306 radiates the signal for reception by another device, such as, the access point 104.

When the communication device 102 receives a signal, the data and control interface 312 controls the duplexer 350 to connect the filter 344 to the antenna 306. The antenna 306 then propagates the signal to filter 344 which filters frequencies outside the receive band. The LNA 356 amplifies the signal and propagates the amplified signal to balun 332. The balun 332 converts the signal into I and Q components which are passed to the receive circuitry 324. The receive circuitry 324 down-converts the RF signal to its I and Q baseband components in a process that is reverse to the process described in relation to transmit circuitry 322, using an IQ demodulator, baseband filter, and analog to digital converter (ADC). The signal is then passed to the baseband processor 304 for demodulation and decryption. The resultant signal is transmitted to the MAC processor 302 and/or the application processor 202 for further processing. Similarly, the components 312, 316, 326, 334, 340, 346, and 352 are configured to transmit a signal using antenna 308. The antenna 308 is also configured to receive a signal and propagate the signal to the baseband processor 304 via the components 352, 348, 354, 336, 328, 314 and 312.

Although this embodiment illustrates the transceiver chip 204 with two transceiver paths (e.g., MIMO 2×2) each having a transmit path and a corresponding receive path, in other embodiments the Wi-Fi transceiver chip 204 is configured with more than two transceiver paths. For one alternative embodiment, chip 204 includes four transceiver paths to enable MIMO 4×4 operation. Moreover, the embodiment shown in FIG. 3 supports 5 GHz operations. However, additional components can be added to simultaneously support 2.4 GHz operations. For example, for each Rx path, 2.4 GHz operation would have separate a LNA and IQ demodulator. However, the baseband filter and ADCs may be shared with 5 GHz Rx. For each Tx chain, 2.4 GHz operation would have a separate IQ modulator and PA. The filter and DACs could be shared with the 5 GHz Tx. Additionally, externally each path would have a Diplexer to combine the 2.4 GHz and 5 GHz to single antenna, if a shared antenna is used, as is the case for many smartphones.

In the prior art, when a communication device is attached to a charger, there is an assumption that the device receives enough power to continue MIMO operations without regard for efficiency. However, the disclosed embodiments illustrates methods to determine when it is appropriate to actually fully or partially disable MIMO operation when the communication device is attached to a battery. When MIMO operations of the communication device 102 are "disabled", power to one or more transceiver paths of the communication device 102 is reduced in whole or part to partially or fully disable the transceiver path. Thus, the term "disable" includes both a partial and a full disabling of a transceiver path or of MIMO operation in general. Likewise, the term "enable" includes both a partial and a full enabling of a transceiver path or of MIMO operation in general. For one embodiment, a full disabling of MIMO operation means using a single transceiver path at a time to both transmit and receive data.

Partially disabling MIMO operation means only some MIMO functionality is disabled. For one example, the MIMO operation is reduced from MIMO 4×4 to MIMO 2×2. In another example, downlink communications on a receive path are carried out using MIMO operation, while corresponding uplink communications on a transmit path are carried out using non-MIMO communications. Thus, a transmit path of at least one transceiver path is disabled (e.g., disconnected from power) while the receive path remains enabled. For yet another example, uplink communications on a transmit path are carried out using MIMO operation, while corresponding downlink communications on a receive path are carried out using non-MIMO communications. Thus, a receive path of at least one transceiver path is disabled (e.g., disconnected from power) while the transmit path remains enabled. For another embodiment, MIMO operation is disabled for some data rates but not for others.

Figure 4:
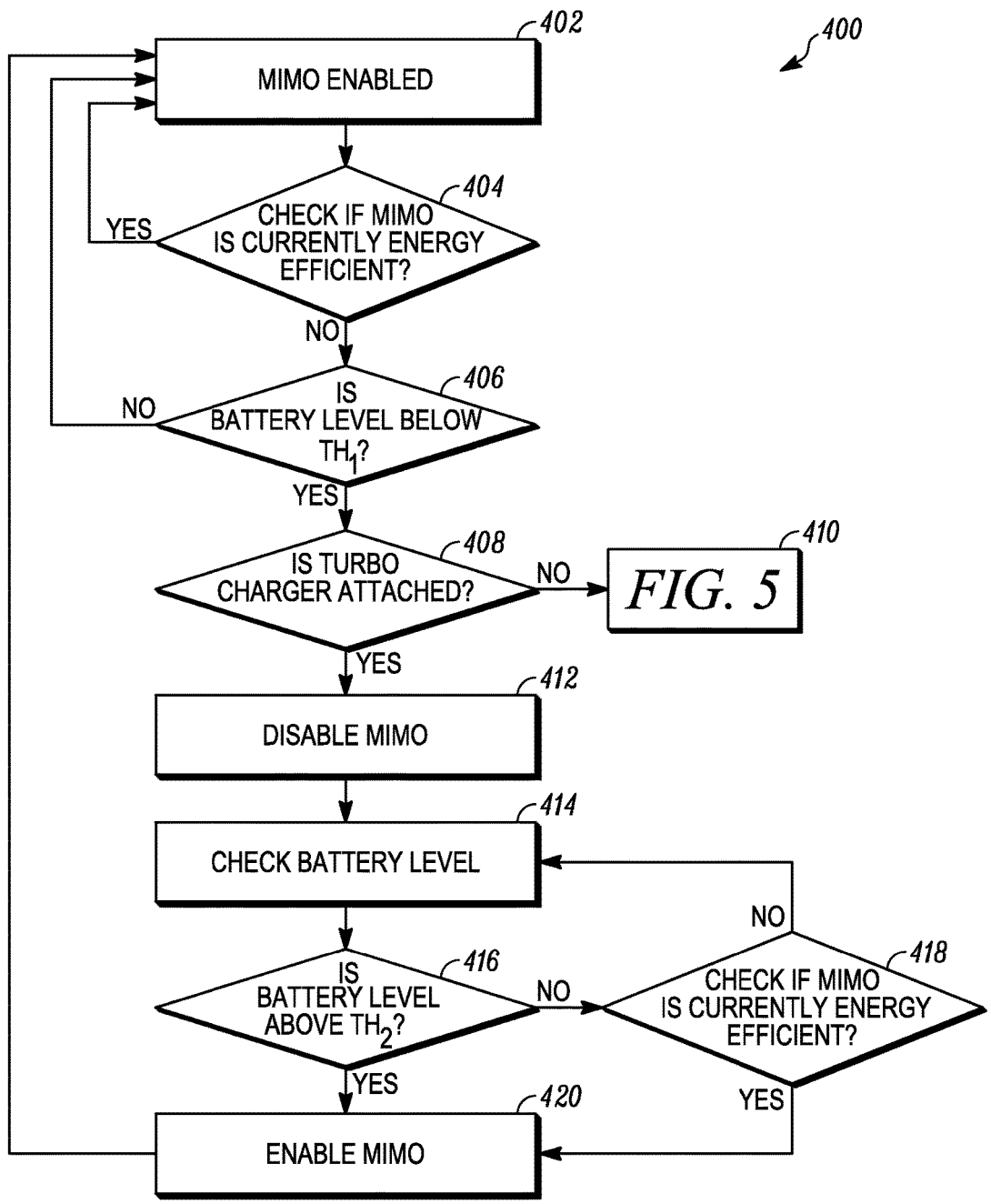
FIG. 4 is a flow diagram illustrating an embodiment of a method for controlling MIMO operation in a communication device attached to a battery charger.

FIG. 4 illustrates an embodiment where a communication device, such as the communication device 102, disables MIMO operation while the device is attached to a battery charger. Illustrated in FIG. 4 is a method 400. At some time, the communication device 102 is MIMO enabled 402, wherein all of the transceivers are operating to carry out communications using MIMO. The communication device 102 then checks 404 to see if MIMO is currently energy efficient. This can be done any number of ways. However, is some embodiments MIMO efficiency is determined using one or more of methods 600 of FIG., 700 of FIG. 7, or 800 of FIG. 8, which are described in detail below. If MIMO operation is energy efficient, e.g., given the battery constraints of the device 102, MIMO operation is kept enabled, at block 402.

However, where MIMO operation is not energy efficient, the communication device 102 checks the amount of battery remaining and determines 406 whether the battery level is below a first battery level threshold $TH_1$. If the battery level exceeds $TH_1$, the communication device 102 continues MIMO operation, whereby faster communication is prioritized over battery life. For example, battery level could be detected as a percentage of battery capacity or as battery charge in mAh.

For one embodiment, the communication device 102 includes a power management system configured to manage its rechargable internal battery 210. Some smart phones have a fuel gauge (battery charge indicator) integrated circuit (IC) to determine the remaining battery charge. The IC may be stand-alone or embedded as a function in a power management IC that could be incorporated into the charge adapter 212, for instance. Fuel gauges may use a coloumb counter and/or other technology, such as voltage methods and Kalman filters, to determine the remaining battery charge. The remaining battery charge is typically reported as a percentage that represents percentage of remaining charge compared to the total battery capacity (e.g., 63%). The phone continues to report this percentage even when charging.

Some smart phones have a fuel gauge (battery charge indicator) IC to determine the remaining battery charge. The IC may be stand-alone or embedded as a function in a power management IC. Fuel gauges may use a coloumb counter and/or other technology to determine the remaining battery charge. The remaining battery charge is typically reported as a percentage that represents percentage of remaining charge compared to the total battery capacity (e.g., 63%). The phone continues to report this percentage even when charging.

Where the battery level falls below $TH_1$, the method proceeds with the communication device 102 determining 408 whether it is attached to a turbo charger. For one embodiment, the communication device 102 directly monitors a type of battery charger to which it is attached, for instance using a identifier sent from the battery charger to the communication device. For another embodiment, the communication device 102 uses one or more indirect methods to monitor and determine the type of battery charger to which it is attached. For example, the communication device 102 uses the coulomb counter or voltage method to determine the current or voltage coming from the battery charger. A current or voltage that exceeds a particular threshold set in the device 102 signals that a turbo charger is attached to the device 102.

Figure 5:
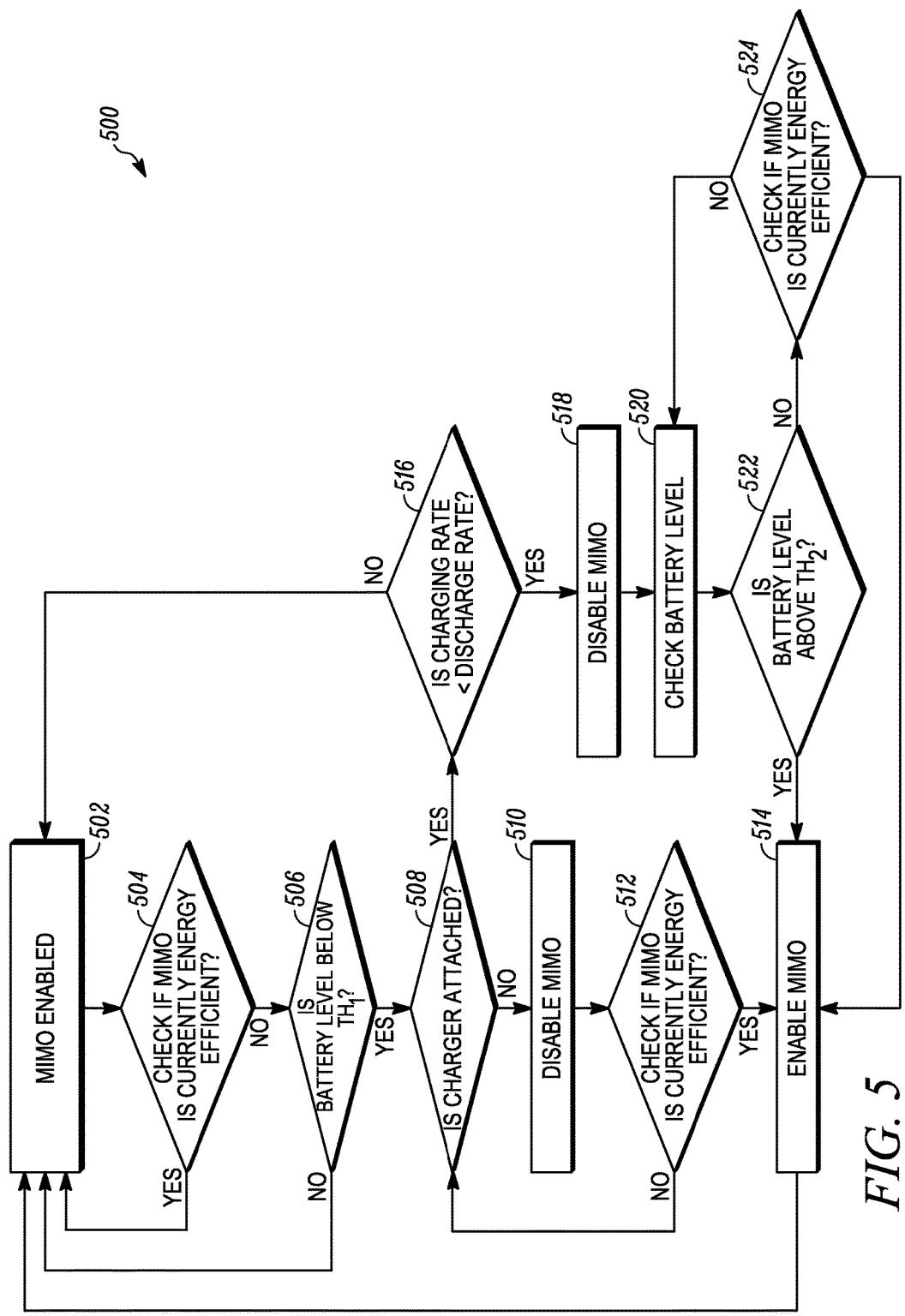
FIG. 5 is a flow diagram illustrating an embodiment of another method for controlling MIMO operation in a communication device attached to a battery charger.

If the communication device 102 determines 408 that a turbo charger is not attached, the method proceeds to FIG. 5, illustrated as a block 410. If the communication device 102, by contrast, determines 408 that it is attached to a turbo charger, the communication device 102 either partially or fully disables MIMO operation. For an embodiment, the application processor 202 and/or charging adapter 212 communicate one or more signals or flags to the Wi-Fi chip interface 358, which is provided to the data and control interface 312 to open one or more of the switches 314, 316, 318, or 320 to disable MIMO.

Figure 6:
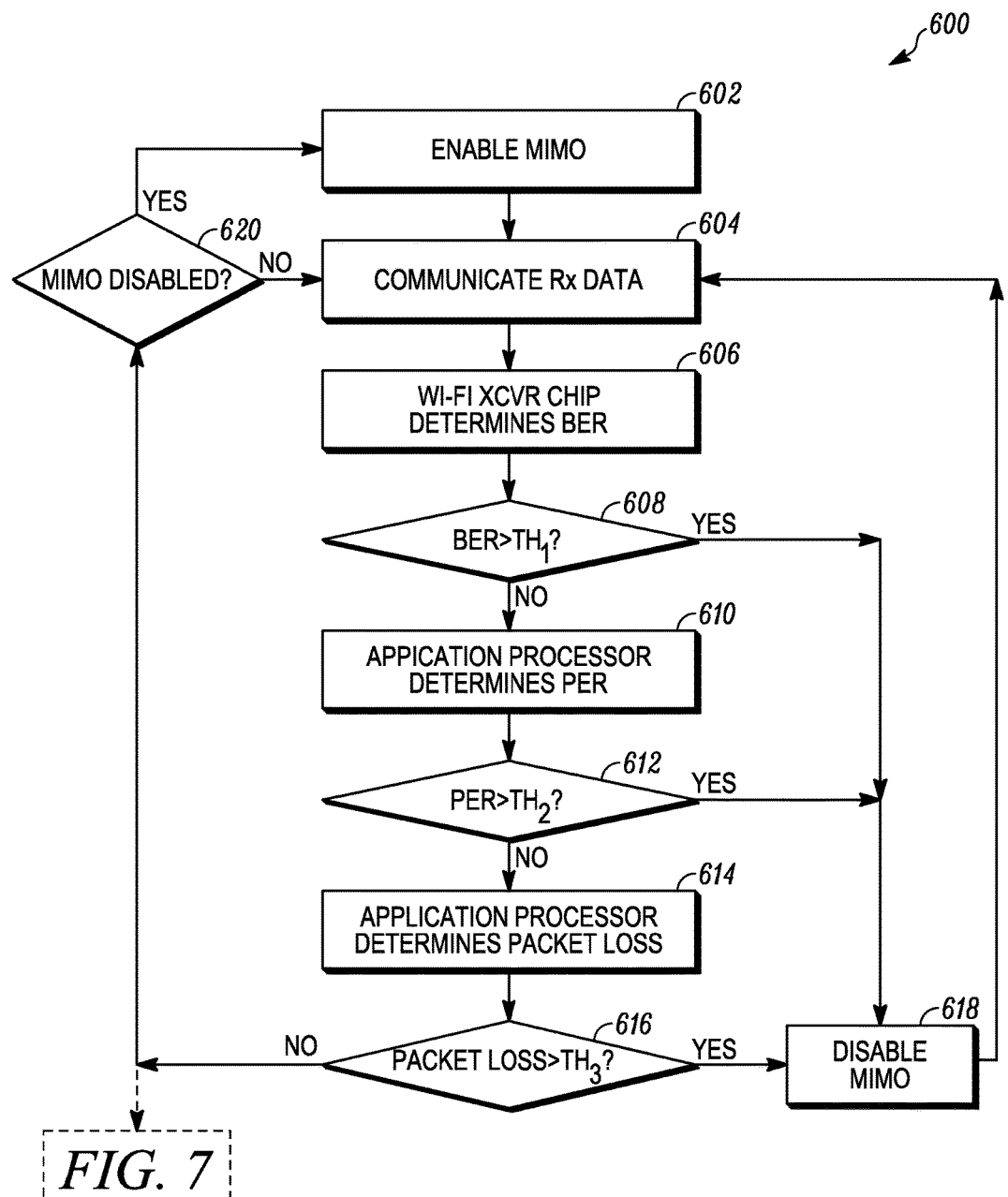
FIG. 6 is a flow diagram illustrating an embodiment of a method for controlling MIMO operation in a communication device based on parameters that indicate quality of service when receiving data.
Figure 7:
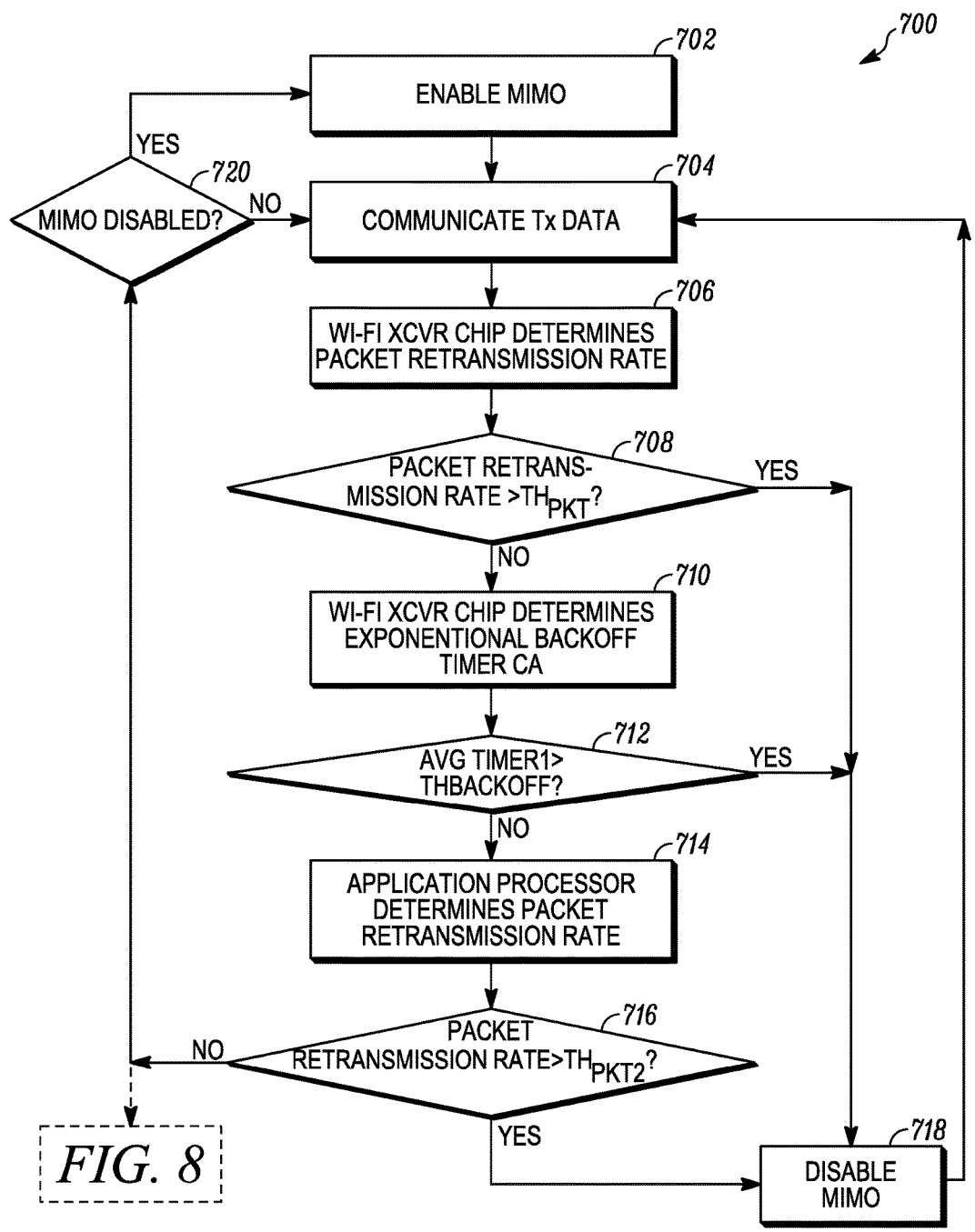
FIG. 7 is a flow diagram illustrating an embodiment of a method for controlling MIMO operation in a communication device based on parameters that indicate quality of service when transmitting data.
Figure 8:
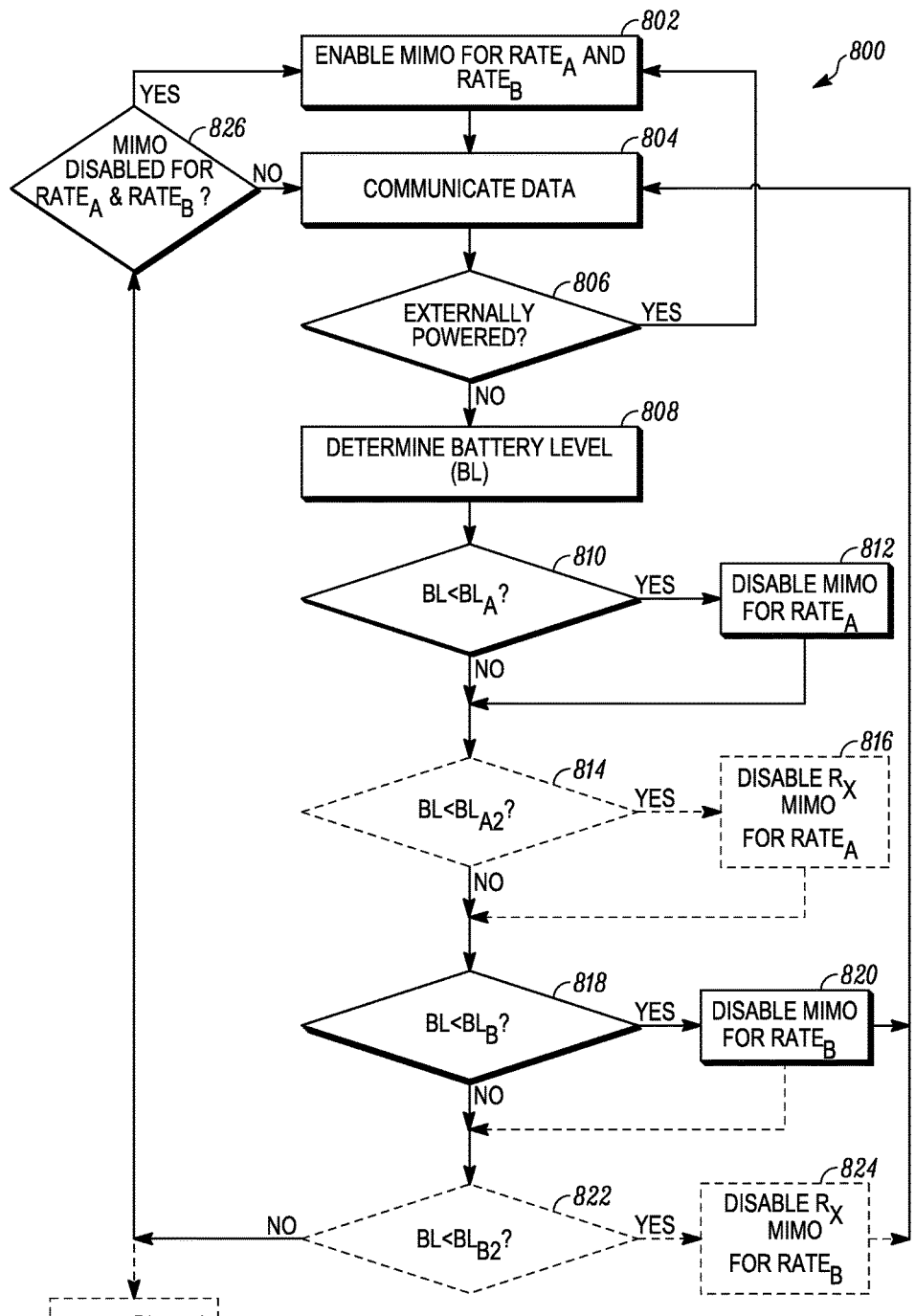
FIG. 8 is a flow diagram illustrating an embodiment of a method for controlling MIMO operation in a communication device based on battery level and data rate.

The communication device 102 then checks 414 the battery level and determines whether 416 the battery level is above a second battery level threshold $TH_2$ and whether 418 MIMO is currently energy efficient e.g., using one or more of the methods illustrated in FIGS. 6, 7, and 8. If either condition is met, the communication device 102 either partially or fully re-enables MIMO at block 420 and repeats the method 400. If neither condition is met, the communication device 102 rechecks 414 the battery level and the two conditions in blocks 416 and 418. For an embodiment, $TH_2$ is set to a charge percentage above which the device battery 210 ceases to quick charge, e.g., 70% or 75%. For instance, for some turbo chargers, the larger current to more rapidly charge the device battery is only supplied until the device battery reaches a certain level, wherein the current is decreased to a conventional amount to charge the battery toward its full capacity. This technique helps to prevent overheating the battery, thereby preserving the longevity of the battery.

FIG. 5 illustrates another embodiment where a communication device, such as the communication device 102, disables MIMO operation while the device is attached to a battery charger. Illustrated in FIG. 5 is a method 500. At some time, the communication device 102 is MIMO enabled 502, wherein all of the transceivers are operating to carry out communications using MIMO. The communication device 102 then checks 504 to see if MIMO is currently energy efficient. This can be done any number of ways. However, is some embodiments MIMO efficiency is determined using one or more of methods 600 of FIG., 700 of FIG. 7, or 800 of FIG. 8, which are described in detail below. If MIMO operation is energy efficient, e.g., given the battery constraints of the device 102, MIMO operation is kept enabled, at block 502.

However, where MIMO operation is not energy efficient, the communication device 102 checks the amount of battery remaining and determines 506 whether the battery level is below a first battery level threshold $TH_1$. If the battery level exceeds $TH_1$, the communication device 102 continues MIMO operation, whereby faster communication is prioritized over battery life. For example, battery level could be detected as a percentage of battery capacity or as battery charge in mAh.

Where the falls below $TH_1$, the method proceeds with the communication device 102 determining 508 whether it is attached to a battery charger. For one embodiment, the communication device 102 directly monitors a type of battery charger to which it is attached, for instance using a identifier sent from the battery charger to the communication device. For another embodiment, the communication device 102 uses one or more indirect methods to monitor and determine the type of batttery charger to which it is attached. For example, the communication device 102 uses the coulomb counter or voltage method to determine the current or voltage coming from the battery charger.

Where the communication device 102 determines 508 that it is attached to a battery charger, it determines whether the MIMO operation is interfering with the charging of the device battery 210. To do this, the communication device 102 determines 516 whether a charging rate of the battery 210 exceeds a discharge rate of the battery 210. For instance, the device 102 can monitor the battery charge remaining percentage. If the percentage remaining decreases over time while attached to battery charger, the discharge rate is greater than the charging rate. The user may see the battery remaining at 30% even though connected to the charger, for example. Or the user may even observe it decreasing 30%, 29%, 26%, etc. Instead of percentage, battery charge in mA could be used. If decreasing (e.g., 780 mAh, 765 mAh, 743 mAh, etc.), the discharge rate exceeds the rate.

In this case the communication device 102 either partially or fully disables MIMO 518. The communication device 102 then checks 520 that battery level and determines whether 522 the battery level is above a second battery level threshold $TH_2$ and whether 524 MIMO is currently energy efficient e.g., using one or more of the methods illustrated in FIGS. 6, 7, and 8. If either condition is met, the communication device 102 either partially or fully re-enables MIMO at block 514 and repeats the method 500. If neither condition is met, the communication device 102 rechecks 520 the battery level and the two conditions in blocks 522 and 524.

Turning back to decision block 508, where the communication device 102 determines that a charger is not attached, it disables MIMO 510 to conserve its limited battery resources. However, the communication device 102 again checks 512 to see if anything has changed to make MIMO energy efficient despite the limited internal battery resources. If MIMO is now energy efficient, the communication device partially or fully enables MIMO, at block 514, and repeats the method 500 at block 502. Otherwise, MIMO remains disabled until the communication device 102 detects 508 that it is attached to a battery charger and that the charging rate exceeds the discharge rate or detects 512 that MIMO operation is currently energy efficient.

Components of the first and second transceiver paths drain energy from the battery 210. Accordingly, there may be scenarios where the multi-path advantages of MIMO are not worth the extra drain on the battery required to fully operate all the transceiver paths of the communication device 102. For example, if the communication device 102 is operating in an unstable RF environment there may be instances when the quality of service is low. An unstable wireless connection in the downlink (e.g., transmissions from the access point 104 to the communication device 102) results in a high bit error rate (BER), a high packet error rate (PER), and/or a high packet loss which leads to a low quality of service. An unstable connection in the uplink direction can lead to an inordinate number of packet retransmissions at the MAC and/or network layer, large retransmission timer results for collision avoidance, or a higher PER.

A set of one or more processors (for example, the MAC processor 302 and/or the application processor 202) of the communication device 102 are coupled to the Wi-Fi transceiver chip 204 and configured to determine a set of parameters that indicate the quality of service associated with communicating data to another device, such as, the access point 104. In the uplink direction, the set of parameters illustratively includes one or a combination of BER, PER, and packet loss. In the downlink direction, the set of parameters includes one or a combination of packet retransmission rate, Tx PER, and retransmission timer results.

In accordance with the prior art, when the quality of service is low, for example when one or more of these corresponding parameters exceeds a threshold, MIMO is enabled to use multi-path communications for greater reliability. Using MIMO, however, creates a greater battery drain. In one implementation example, using two transceiver paths at HT40 and HT80 results in a current drain of 703 milliamps (mA) and 849 mA, respectively. When the communication device is transmitting using only one transceiver path, however, the current drain on the battery 210 is 351 mA for HT40 and 366 mA for HT80. When the link between the communication device 102 and access point 104 is unstable, the communication redundancy that MIMO provides may not provide a quality of service that is worth the current drain needed to power multiple transceiver paths. In such scenarios, disablement of MIMO in accordance with embodiments described herein can provide for a more efficient usage of battery power. Since MIMO efficiency can change over time, the communication device checks for this efficiency at different points in the methods 400 and 500.

FIG. 6 shows one example method for determining MIMO efficiency and controlling MIMO operations in a communication device, e.g., device 102, based on quality of service parameters associated with receiving data from another device in accordance with the present teachings. For instance, the communication device 102 is in a state where it is enabled 602 for MIMO operation 602. In this example, when MIMO is enabled, both transceiver paths are connected to the baseband processor using switches 320, 318, 316, and 314 to receive power and to transmit and receive data. When the device 102 receives 604 data, the MAC processor 302 determines 606 the BER as a first parameter of the set of parameters that indicate quality of service. The BER is the bit error per unit time, where a bit error occurs when a bit of a data stream transmitted over a communication channel has been altered due to noise, interference, distortion or bit synchronization errors. The MAC processor 302 compares 608 the measured BER with a bit error rate threshold ($TH_1$). If the BER is greater than $TH_1$, the MAC processor 302 initiates 618 disabling MIMO.

In some implementations, to initiate disabling MIMO, the media access control processor 302 communicates a signal to the data and control processor 312 which responsively disables, in whole or part, at least one transceiver path of the multiple transceiver paths of the communication device 102. In this example the communication device 102 has two transceiver paths, so fully disabling MIMO operation includes disabling one transceiver path leaving the device 102 using the one remaining enabled transceiver path to communicate data. By contrast partially disabling MIMO means disabling only the receive path of one of the transceiver paths and leaving the corresponding transmit path enabled.

If the BER is less than $TH_1$, the application processor 202 determines 610 the PER. The PER is a ratio of the number of incorrectly received packets to correctly received packets. A packet is incorrect if at least one bit of the packet is erroneous. The PER is compared 612 with a packet error rate threshold ($TH_2$). If the PER is greater than $TH_2$, the application processor 202 initiates disabling 618 of MIMO operations. To initiate disabling of MIMO operations, the application processor 202 illustratively communicates a signal to the data and control interface 312 via the Wi-Fi chip interface 356, and the data and control interface 312 responsively powers down components of the disabled transmit and/or receive path.

If the PER is less than $TH_2$, the application processor 202 determines 614 packet loss. Packet loss occurs when one or more packets travelling through a network fails to reach its destination. Packet loss is detected, for example, when the application processor 202 determines that a packet in a sequence of packets is missing. The packet loss is compared 616 with a packet loss threshold ($TH_3$). If the packet loss is greater than $TH_3$, then the application processor 202 initiates disabling 618 MIMO operation. In one embodiment, at least one processor of the set of processors is configured to initiate disabling 618 MIMO operation by initiating disabling of a receive path when one more parameters of BER, PER, or packet loss exceeds a corresponding threshold in the set of thresholds.

After MIMO is disabled 618, the communication device 102 continues to receive 604 data. As the communication device 102 engages in data communications the set of processors continue to determine whether any parameters in the set of parameters exceeds the one or more thresholds in the set of thresholds (e.g., the determinations at 608, 612, and 616). If none of the parameters exceeds the one or more thresholds and MIMO is disabled 620, then MIMO operation is re-enabled 602. Re-enabling MIMO 602 includes re-enabling one or more transmit or receive paths that were previously disabled. If none of the parameters exceeds their respective threshold and MIMO operation is not disabled 620, the communication device 102 continues to receive 604 receive. Alternatively, is none of the parameters exceeds their respective threshold, the method continues to FIG. 7.

The parameters determined in the method 600 are associated with a quality of service as relates to downlink communications. In the uplink, parameters such as packet retransmission rate, retransmission timer results, and PER indicate a quality of service associated with communicating uplink data. FIG. 7 illustrates a flow diagram of an embodiment of a method for determining MIMO efficiency and controlling MIMO operation in the communication device in accordance with quality of service that is based on one or a combination of a packet retransmission rate, a retransmission timer result, or a PER.

For instance, the communication device 102 is in a state where it is enabled for MIMO operation 702. When the device 102 is transmitting 704 data, the MAC processor 302 of the Wi-Fi transceiver chip 204 determines 706 a packet retransmission rate at the MAC layer as a parameter of the set of parameters which indicate quality of service. A packet retransmission occurs when the communication of a data packet goes unacknowledged by the intended recipient of the packet. The packet retransmission rate is a measure of retransmissions that occur per unit time. The MAC processor 302 compares 708 the packet retransmission rate to a packet retransmission rate threshold ($TH_{pkt}$) and disables 718 MIMO operation if the packet retransmission rate is greater than $TH_{pkt}$.

If the packet retransmission rate is not greater (e.g., is less than) than $TH_{pkt}$, the MAC processor 302 determines 710 the retransmission timer result and compares 712 the retransmission timer result with a timer threshold ($TH_{backoff}$). The retransmission timer results or exponential backoff timer, is a timer used to space out transmissions of multiple devices on a shared channel. If the communication device 102 is trying to transmit a packet and another device is trying to simultaneously transmit on the same channel, the communication device 102 sets a timer to transmit at a later time. The length of this timer is randomly selected in the hopes of avoiding another collision when retransmitting. If another collision occurs, the length of the retransmission timer increases. The timer is increased until a transmission can be completed without a collision. If the retransmission timer result is greater than $TH_{backoff}$, the MAC processor 302 disables 718 MIMO operation. If the retransmission timer result is not greater than $TH_{backoff}$, the application processor 302 determines 714 a retransmission rate of packets occurring, for example, at layer 3 (e.g., IP layer) and/or layer 4 (e.g., transmission control protocol or user datagram protocol).

The application processor 202 compares 716 the retransmission rate against a second retransmission threshold ($TH_{pkt2}$) and disables 718 MIMO operation when the retransmission rate is greater than $TH_{pkt2}$. For example, when disabling 718 MIMO the application processor 302 disables one transmit path (e.g., the transmit path of the first transceiver path) while leaving active the corresponding receive path (e.g., the receive path of the first transceiver path). In other example embodiments, either the MAC processor 302 or the application processor 202 or both is configured to initiate disabling 718 of a transmit path of the communication device 102 when at least one of the packet retransmission rate or retransmission timer results exceeds a corresponding threshold in the set of thresholds, in this example using the determinations at 708, 712, and 716.

Although the methods of 600 and 700 are illustrated as separate methods which are performed sequentially with method 600 performed before method 700, in other embodiments the method 700 is performed before method 600. In still other embodiments, the methods 600, 700 are performed simultaneously with or more of the set of processors performing aspects of one method and switching to perform limitations of the other method. Moreover, in some implementations of the methods 600, 700 the order of determining the BER, PER, packet loss, and retransmission results differs. According to some embodiments, determining the set of parameters that indicates a quality of service and comparing the parameters to a set of thresholds includes determining at least two of determining BER and comparing the BER to $TH_1$, determining PER and comparing the PER to $TH_2$, determining packet loss and comparing the packet loss to $TH_3$, determining packet retransmission rate and comparing the packet retransmission rate to $TH_{pkt}$ and/or $TH_{pkt2}$, or determining retransmission timer results and comparing the retransmission timer results to $TH_{backoff}$. MIMO is disabled if at least two of the BER exceeds $TH_1$, the PER exceeds $TH_2$, the packet loss exceeds $TH_3$, the packet retransmission rate exceeds $TH_{pkt}$ or $TH_{pkt2}$, or retransmission timer results exceeds $TH_{backoff}$.

The methods 600 and 700 address scenarios related to determining whether a data link provides such poor quality of service that the increase in reliability is not worth the battery drain of multi-path communications. In other scenarios, the increase in the throughput that MIMO provides does not outweigh the battery drain needed to operate in MIMO mode. For example, when communicating with MIMO disabled at HT40, one example device communicates with a throughput of 90 megabits per second (Mb/s) with a current drain of 351 milliamps (mA) which provides a battery capacity impact per bit of 8.8 milliamp per hour per Gigabyte (mAh/GB). When operating at HT40 using two enabled transceiver paths, the communication device experiences a throughput of 117 Mb/s, a current drain of 703 mA, and a 13.6 mAh/GB battery impact. Thus, when the device operates at HT40 using two transceiver paths, there is about a 30% gain in throughput, but there is a approximately a 100% increase in battery drain. Depending on how much charge remains in the battery, the gain in throughput may not outweigh the risk of completely draining the battery and rendering the communication device unable to communicate using data or voice.

FIG. 8 illustrates a method of determining MIMO efficiency and controlling MIMO operation in a communication device based on at least one of battery level and data rate in accordance with the present teachings. The communication device 102 is enabled 802 to operate in MIMO and is configured to communicate 804 data for at least two different rates (e.g., $Rate_A$ and $Rate_B$). In one example embodiment, $Rate_A$ is lower than $Rate_B$. Illustratively, $Rate_A$ supports one of 802.11 HT40 or 802.11 HT20, and $Rate_B$ supports 802.11 HT80. In still other embodiments, $Rate_A$ and $Rate_B$ are other rates associated with 802.11ac, such as HT20, HT40, HT80, HT160, etc. In other embodiments, $Rate_A$ is not lower than $Rate_B$ and/or the rates are associated with one or more other wireless technologies capable of supporting MIMO communications, such as, HSPA+, WiMax, LTE, and the like.

The communication device 102 is configured such that the user can operate the device while a charging adapter 212 is engaged. When the device 102 is receiving external power through the adapter 212, the device 102 can in some scenarios perform MIMO communications without concern for the extra battery drain caused by enabling multiple transceiver paths. A processor from the set of processors (e.g., the application processor 202) determines whether the communication device 102 is externally powered. If the adapter 212 is connected, MIMO $Rates_{A\&B}$ are enabled 802 and the device 102 continues to communicate 804 using MIMO operation while the communication device 102 is externally powered.

If the device 102 is not externally powered, one of processors determines 608 a battery level (BL) and a data rate at which the device 102 is currently operating. The BL corresponds with an amount charge remaining in the battery 210. The BL is compared against one or more battery level thresholds. In this scenario, the BL is compared against two battery level thresholds ($BL_A$, $BL_B$), where $BL_A$ is higher than $BL_B$. The result of a comparison of the BL against a battery level threshold and the data rate is evaluated to determine whether to disable MIMO. If, for example, the device is operating at $Rate_A$ and $BL<BL_A$ 810, then MIMO is disabled 812 for $Rate_A$.

If the device 102 is transmitting data at $Rate_B$ and BL is less than $BL_B$ 818, MIMO is disabled 820 for $Rate_B$ and the device 102 continues to communicate 804 data with one or more transmit or receiver paths disabled. If the device 102 is not transmitting at $Rate_B$ or BL is not less than $BL_B$, the device 102 determines 826 whether MIMO is disabled for both $Rate_A$ and $Rate_B$. If MIMO is disabled for both rates, then MIMO is enabled 802 for $Rate_A$ and $Rate_B$ and the device continues communicating 804 data with MIMO enabled for both rates. If MIMO is not disabled for both rates, then the device 102 continues to communicate 604 data in its current state.

In some embodiments, the device 102 can perform method 600 to a finer granularity to disable MIMO by disabling a receive path of the MIMO operation while leaving active a corresponding transmit path. For example, if the device 102 determines 810 that the data rate is not $Rate_A$ or the BL is not less than $BL_A$, the device 102 determines 814 if the rate is $Rate_A$ and the BL is less than $BL_{A2}$. $BL_{A2}$ is illustratively a battery level that is between $BL_A$ and $BL_B$. If the BL is less than $BL_{A2}$ and the rate is $Rate_A$, the receive path of the second transceiver path is disabled 816 while the transmit path of the second transceiver path remains active. Thus in this scenario, the transmit and receive paths of the first transceiver path are active while only the transmit path of the second transceiver path is remains active. In other scenarios, the transmit path of the second transceiver path is disabled 816 while the receive path of the second transceiver path remains active.

The communication device 102 is also configured to determine 822 if the data rate is $Rate_B$ and BL is less than $BL_{B2}$, where $BL_{B2}$ is less than $BL_B$. If the rate is $Rate_B$ and BL is less than $BL_{B2}$, a receive path of a transceiver path is disabled 820 while the corresponding transmit path of the second transceiver path remains active. In other scenarios, the transmit path is disabled while the receive path remains active. As the device 102 continues to communicate, the BL is compared against $BL_A$ and $BL_B$ and optionally $BL_{A2}$ and $BL_{B2}$. As the battery level drops the communication device 102 continues to disable transceiver paths, transmit paths, and receive paths.

When executing the method 600 or method 700, if none of the parameters in the set of parameters exceeds the one or more thresholds in the set of thresholds, in some example embodiments the method 800 of FIG. 8 is executed. When none of the parameters in the set of parameters exceeds the one or more thresholds, the method 600 and 700 further include determining the BL of the communication device 102 and a data rate at which the device 102 is communicating data. Further, if the BL is less than a first battery level (i.e., $BL_A$ or $BL_{A2}$) when the data rate is $Rate_A$, MIMO is disabled for Rate$_A$. If the BL is below a second battery level (i.e., BL$_B$ or BL$_{B2}$) when the data rate is Rate$_B$, MIMO is disabled for operation of Rate$_B$.

When executing the method 800 of FIG. 8, if the device 102 is communicating with MIMO enabled and the device 102 is not communicating at Rate$_A$ when BL is less than BL$_A$ or communicating at Rate$_B$ when BL is below BL$_B$, the method 600 of FIG. 6 and/or the method 700 of FIG. 7 is sequentially or simultaneously executed. In this scenario, the method 800 further includes determining a set of parameters that indicate quality of service associated with communicating data when BL exceeds BL$_A$ and BL$_B$. The set of parameters is compared to a set of thresholds and MIMO is disabled when one or more parameters in the set of parameters exceed one or more thresholds in the set of thresholds. Determining the set of parameters that indicate quality of service and comparing the parameters against a set of thresholds includes determining the BER and comparing the BER to TH$_1$, determining the PER and comparing the PER to TH$_2$, determining packet loss and comparing the packet loss to TH$_3$, determining packet retransmission rate and comparing the packet retransmission rate to TH$_{pkt}$ and/or TH$_{pkt2}$, or determining retransmission timer results and comparing the retransmission timer results to TH$_{backoff}$. The MIMO operation is disabled when at least one of the BER exceeds TH$_1$, the PER exceeds TH$_2$, the packet loss exceeds TH$_3$, the packet retransmission rate exceeds TH$_{pkt}$ and/or TH$_{pkt2}$, or the retransmission timer results exceed TH$_{backoff}$.

In accordance with the present teachings, a method for controlling multiple-input and multiple-output operation of a communication device when the communication device is attached to a battery charger includes determining that a battery level of a communication device is below a first battery level threshold. The method also includes determining that the communication device is attached to a battery charger and determining whether to disable multiple-input and multiple-output operation of the communication device while it is attached to the battery charger.

For a first embodiment, determining whether to disable the multiple-input and multiple-output operation includes monitoring a type of charger to which the communication device is attached and disabling the multiple-input and multiple-output operation upon determining that the type of battery charger is a turbo charger. For a second embodiment, determining whether to disable the multiple-input and multiple-output operation includes monitoring a charging rate and a discharge rate of a battery of the communication device and disabling the multiple-input and multiple-output operation upon determining that the discharge rate exceeds the charging rate.

For both the first and second embodiments, the following features can also be realized for more detailed embodiments. For instance, the methods can include determining whether to re-enable multiple-input and multiple-output operation of the communication device while it is attached to the turbo charger. For one example, determining whether to re-enable the multiple-input and multiple-output operation includes monitoring the battery level of the communication device and determining to re-enable the multiple-input and multiple-output operation upon determining that the battery level exceeds a second battery level threshold.

For another example, determining whether to re-enable the multiple-input and multiple-output operation includes monitoring a set of parameters that indicate quality of service associated with communicating data to another device and re-enabling the multiple-input and multiple-output operation of the communication device when at least one parameter in the set of parameters falls below a corresponding threshold. For a particular embodiment, the set of one or more parameters includes one or a combination of bit error rate, packet error rate, packet loss, packet retransmission rate, or retransmission timer results.

For another embodiment, re-enabling the multiple-input and multiple-output operation of the communication device comprises partially re-enabling the multiple-input and multiple-output operation. For an example, partially re-enabling the multiple-input and multiple-output operation includes enabling a transmit path of a first transceiver path while continuing to disable a receive path of the first transceiver path when at least one of the packet retransmission rate or the retransmission timer results falls below the corresponding threshold. For another example, partially re-enabling the multiple-input and multiple-output operation includes enabling a receive path of a first transceiver path while continuing to disable a transmit path of the first transceiver path when at least one of the bit error rate, the packet error rate, or the packet loss falls below the corresponding threshold.

Yet another embodiment is communication device configured to control multiple-input and multiple-output operation for communicating data. The communication device includes an internal battery, a charge adapter, and a processor (e.g., an application processor) coupled to one or both of the internal battery and the charge adapter. The internal battery is configured to power the communication device. The charge adapter is configured to charge the internal battery when the communication device is attached to a battery charger. The processor is configured to determine that a battery level of the internal battery is below a first battery level threshold, determine that the communication device is attached to the battery charger, and determine whether to disable multiple-input and multiple-output operation of the communication device while it is attached to the battery charger.

For a further embodiment, the processor is configured to determine whether to disable the multiple-input and multiple-output operation by being configured to monitor a type of charger to which the communication device is attached and disable the multiple-input and multiple-output operation upon determining that the type of battery charger is a turbo charger. For yet another embodiment, the processor is configured to determine whether to disable the multiple-input and multiple-output operation by being configured to monitor a charging rate and a discharge rate of a battery of the communication device and disable the multiple-input and multiple-output operation upon determining that the discharge rate exceeds the charging rate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   determining that a battery level of a communication device is below a first battery level threshold while the communication device is attached to a battery charger, the communication device enabling multiple-input and multiple-output (MIMO) operation; and
   determining, based on a type of the attached battery charger, whether to disable multiple-input and multiple-output operation of the communication device while the device is attached to the battery charger.

2. The method of claim 1, wherein determining whether to disable the multiple-input and multiple-output operation comprises:
   monitoring a type of charger to which the communication device is attached; and
   disabling the multiple-input and multiple-output operation upon determining that the type of battery charger is a turbo charger.

3. The method of claim 2 further comprising determining, based on a battery level and a data rate, whether to re-enable multiple-input and multiple-output operation of the communication device while the communication device is attached to the turbo charger.

4. The method of claim 3, wherein determining whether to re-enable the multiple-input and multiple-output operation comprises:
   monitoring the battery level of the communication device; and
   determining to re-enable the multiple-input and multiple-output operation upon determining that the battery level exceeds a second battery level threshold.

5. The method of claim 3, wherein determining whether to re-enable the multiple-input and multiple-output operation comprises:
   monitoring a set of parameters that indicate quality of service associated with communicating data to another device; and
   re-enabling the multiple-input and multiple-output operation of the communication device when at least one parameter in the set of parameters falls below a corresponding threshold.

6. The method of claim 5, wherein the set of parameters comprises at least one of bit error rate, packet error rate, packet loss, packet retransmission rate, or retransmission timer results.

7. The method of claim 6, wherein re-enabling the multiple-input and multiple-output operation of the communication device comprises partially re-enabling the multiple-input and multiple-output operation by enabling only one path from among a transmit path and a receive path, while the device remains connected to the attached battery charger.

8. The method of claim 7, wherein partially re-enabling the multiple-input and multiple-output operation comprises enabling a transmit path of a first transceiver path while continuing to disable a receive path of the first transceiver path when at least one of the packet retransmission rate or the retransmission timer results falls below the corresponding threshold.

9. The method of claim 7, wherein partially re-enabling the multiple-input and multiple-output operation comprises enabling a receive path of a first transceiver path while continuing to disable a transmit path of the first transceiver path when at least one of the bit error rate, the packet error rate, or the packet loss falls below the corresponding threshold.

10. The method of claim 1, wherein determining whether to disable the multiple-input and multiple-output operation comprises:
    monitoring a charging rate and a discharge rate of a battery of the communication device; and
    disabling the multiple-input and multiple-output operation upon determining that the discharge rate exceeds the charging rate.

11. The method of claim 10, further comprising determining whether to re-enable multiple-input and multiple-output operation of the communication device while the device is attached to the battery charger, wherein determining whether to re-enable the multiple-input and multiple-output operation comprises:
    monitoring the battery level of the communication device;

determining to re-enable the multiple-input and multiple-output operation upon determining that the battery level exceeds a second battery level threshold.

12. The method of claim 10, further comprising determining whether to re-enable multiple-input and multiple-output operation of the communication device while the device is attached to the battery charger, wherein determining whether to re-enable the multiple-input and multiple-output operation comprises:
monitoring a set of parameters that indicate quality of service associated with communicating data to another device;
re-enabling the multiple-input and multiple-output operation of the communication device when at least one parameter in the set of parameters falls below a corresponding threshold.

13. The method of claim 12, wherein the set of parameters comprises at least one of bit error rate, packet error rate, packet loss, packet retransmission rate, or retransmission timer results.

14. The method of claim 13, wherein re-enabling the multiple-input and multiple-output operation of the communication device comprises partially re-enabling the multiple-input and multiple-output operation.

15. The method of claim 14, wherein partially re-enabling the multiple-input and multiple-output operation comprises enabling a transmit path of a first transceiver path while continuing to disable a receive path of the first transceiver path when at least one of the packet retransmission rate or the retransmission timer results falls below the corresponding threshold.

16. The method of claim 14, wherein partially re-enabling the multiple-input and multiple-output operation comprises enabling a receive path of a first transceiver path while continuing to disable a transmit path of the first transceiver path when at least one of the bit error rate, the packet error rate, or the packet loss falls below the corresponding threshold.

17. The method of claim 1, further comprising:
monitoring and determining the type of battery charger using one of an identifier sent from the battery charger, a coulomb counter, and a voltage method that determines a current or voltage coming from the battery charger, wherein a current or voltage that exceeds a threshold that is set in the communication device signals that a turbo charger is attached.

18. A communication device configured to control multiple-input and multiple-output operation for communicating data, the communication device comprising:
an internal battery configured to power the communication device;
a charge adapter configured to charge the internal battery when the communication device is attached to a battery charger;
a processor coupled to at least one of the internal battery or the charge adapter, wherein the processor is configured to:
determine that a battery level of the internal battery is below a first battery level threshold;
determine that the communication device is attached to the battery charger while the battery level is below the first battery level threshold; and
determine, based on a type of the attached battery charger, whether to disable multiple-input and multiple-output operation of the communication device while the device is attached to the battery charger.

19. The communication device of claim 18, wherein the processor is configured to determine whether to disable the multiple-input and multiple-output operation by being configured to:
monitor a type of charger to which the communication device is attached; and
disable the multiple-input and multiple-output operation upon determining that the type of battery charger is a turbo charger.

20. The communication device of claim 18, wherein the processor is configured to determine whether to disable the multiple-input and multiple-output operation by being configured to:
monitor a charging rate and a discharge rate of a battery of the communication device; and
disable the multiple-input and multiple-output operation upon determining that the discharge rate exceeds the charging rate.

* * * * *